US010891172B2

(12) United States Patent
Yang et al.

(10) Patent No.: US 10,891,172 B2
(45) Date of Patent: Jan. 12, 2021

(54) MODIFYING AN OPERATING SYSTEM (71) Applicant: INTEL CORPORATION, Santa Clara, CA (US)

(72) Inventors: Yuping Yang, Shanghai (CN); Dujian Wu, Shanghai (CN); Shijie Liu, Shanghai (CN); Daquan Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 15/770,790

(22) PCT Filed: Dec. 24, 2015

(86) PCT No.: PCT/CN2015/098639
§ 371 (c)(1),
(2) Date: Apr. 25, 2018

(87) PCT Pub. No.: WO2017/107120
PCT Pub. Date: Jun. 29, 2017

(65) Prior Publication Data
US 2018/0314568 A1    Nov. 1, 2018

(51) Int. Cl.
*G06F 9/54*     (2006.01)
*G06F 9/4401*   (2018.01)
(Continued)

(52) U.S. Cl.
CPC ............ *G06F 9/542* (2013.01); *G06F 9/4401* (2013.01); *G06F 9/45558* (2013.01);
(Continued)

(58) Field of Classification Search
CPC .. G06F 9/4401; G06F 9/4812; G06F 9/45558; G06F 2209/542; G06F 2209/45579
See application file for complete search history.

(56) References Cited

U.S. PATENT DOCUMENTS

| 6,928,542 B2 * | 8/2005 | Wen ..................... G06F 9/441 713/2 |
| 7,596,648 B2 * | 9/2009 | Ramgarajan .......... G06F 11/073 710/263 |

(Continued)

FOREIGN PATENT DOCUMENTS

| CN | 101140530 A  | 3/2008 |
| CN | 102043643 A  | 5/2011 |
| WO | 2005064465 A2 | 7/2005 |

OTHER PUBLICATIONS

PCT International Search Report, PCT Application No. PCT/CN2015/098639, dated Sep. 30, 2016, 5 pages.

*Primary Examiner* — Henry Tsai
*Assistant Examiner* — Christopher Daley
(74) *Attorney, Agent, or Firm* — Hanley, Flight & Zimmerman, LLC (57) ABSTRACT

A method includes modifying a basic input/output system (BIOS) to load a virtual general purpose input/output (GPIO) driver in an operating system, the virtual GPIO driver comprising at least one control method to monitor a system control interrupt (SCI) (202). The method can also include detecting the system control interrupt invoking the virtual GPIO driver (204) and executing the control method corresponding to the system control interrupt, the control method to be identified in the modified BIOS (206). Furthermore, the method can include detecting an error from the execution of the control method (208) and modifying an operating system to prevent the error (208), the modification comprising a modification to the control method.

20 Claims, 4 Drawing Sheets

(51) Int. Cl.
*G06F 9/455* (2018.01)
*G06F 9/48* (2006.01)

(52) U.S. Cl.
CPC .. *G06F 9/4812* (2013.01); *G06F 2009/45579* (2013.01); *G06F 2209/542* (2013.01)

(56) References Cited

U.S. PATENT DOCUMENTS

| | | | | |
|---|---|---|---|---|
| 7,752,429 | B2* | 7/2010 | Tung | G06F 9/4401 |
| | | | | 713/2 |
| 8,296,579 | B2* | 10/2012 | Piwonka | G06F 21/572 |
| | | | | 380/278 |
| 9,098,302 | B2* | 8/2015 | Swanson | G06F 9/4406 |
| 9,342,347 | B1* | 5/2016 | Beloussov | G06F 9/45558 |
| 10,360,043 | B2* | 7/2019 | Wynn | |
| 2005/0138256 | A1* | 6/2005 | Bolay | G06F 9/4812 |
| | | | | 710/260 |
| 2006/0136703 | A1* | 6/2006 | Wisecup | G06F 9/4416 |
| | | | | 713/2 |
| 2007/0192520 | A1* | 8/2007 | Ito | G06F 9/4401 |
| | | | | 710/62 |
| 2010/0106951 | A1* | 4/2010 | Lu | G06F 9/541 |
| | | | | 713/1 |
| 2012/0131371 | A1* | 5/2012 | Liu | G06F 1/3203 |
| | | | | 713/340 |
| 2014/0006728 | A1* | 1/2014 | Koide | G06F 9/454 |
| | | | | 711/154 |
| 2015/0067311 | A1* | 3/2015 | Forristal | G06F 9/4403 |
| | | | | 713/2 |
| 2015/0154092 | A1* | 6/2015 | Chen | G06F 9/4401 |
| | | | | 713/2 |
| 2015/0277778 | A1* | 10/2015 | Adams | G06F 13/385 |
| | | | | 710/5 |
| 2017/0024223 | A1* | 1/2017 | Wynn | G06F 9/4411 |

* cited by examiner

MODIFYING AN OPERATING SYSTEM

CROSS REFERENCE TO RELATED APPLICATIONS

Pursuant to 35 U.S.C. § 371, this application is the United States National Stage Application of International Patent Application No. PCT/CN2015/098639, filed on Dec. 24, 2015, the content of which is incorporated by reference as if set forth in its entirety herein.

TECHNICAL FIELD

This disclosure relates generally to operating systems and specifically, but not exclusively, to modifying an operating system based on system control interrupts related to advanced configuration and power interface (ACPI) functions in a basic input/output system (BIOS).

BACKGROUND

Operating systems have evolved to implement a growing number of operational states for computing devices. For example, operating systems can now implement various power states for computing devices defined in the advanced configuration and power interface (ACPI) specification. In some examples, operating systems can implement the ACPI specification to allow a computing device to implement motherboard configuration and power management functions. For example, operating systems can include operating system-directed configuration and power management (OSPM) modules that implement power management policies that are too complicated to implement in BIOS.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Operating systems are implementing increasingly complicated power management functionalities. Frequently, the operating systems can include various errors during development that prevents power management functionalities from functioning properly.

In some embodiments, techniques described herein can provide an alternative method for operating systems to process system control interrupts. For example, operating systems can invoke related control methods corresponding to a virtual GPIO device's events if the virtual GPIO driver does not mask a virtual GPIO device's event. The GPIO framework extension can be used to call control methods associated with a particular controller based on interrupt ownership of a GPIO device. In some examples, a system control interrupt (SCI) can be claimed in a virtual GPIO device definition and the GPIO framework can take it as the virtual GPIO device's. The control methods can provide instructions that are to be executed by the operating system. In some embodiments, the control methods can be loaded from a basic input/output system (BIOS). The GPIO framework extension can coordinate and distribute any suitable control method corresponding to a system control interrupt for any number of GPIO controllers. The control method can be loaded by the operating system and used to transmit ACPI based functions to hardware devices.

The techniques described herein include modifying an operating system in response to detecting that a system control interrupt returns or is triggered by an error from a hardware device. In some embodiments, a device can be defined in a basic input/output system (BIOS) to enable an operating system to load a virtual general purpose input/output (GPIO) driver via a GPIO framework extension, the virtual GPIO driver comprising at least one control method corresponding to a system control interrupt (SCI). For example, the virtual GPIO device can be defined as an ACPI device with a corresponding interrupt request (IRQ) pin or additional resources by ACPI source code language (ASL) code in the BIOS. The system can also detect, via the GPIO framework extension, the system control interrupt invoking the virtual GPIO driver. Furthermore, the system can execute the control method corresponding to the system control interrupt, the control method to be identified in the modified BIOS. Additionally, the system can detect an error from the execution of the control method via the GPIO framework extension and modify an operating system to prevent the error.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
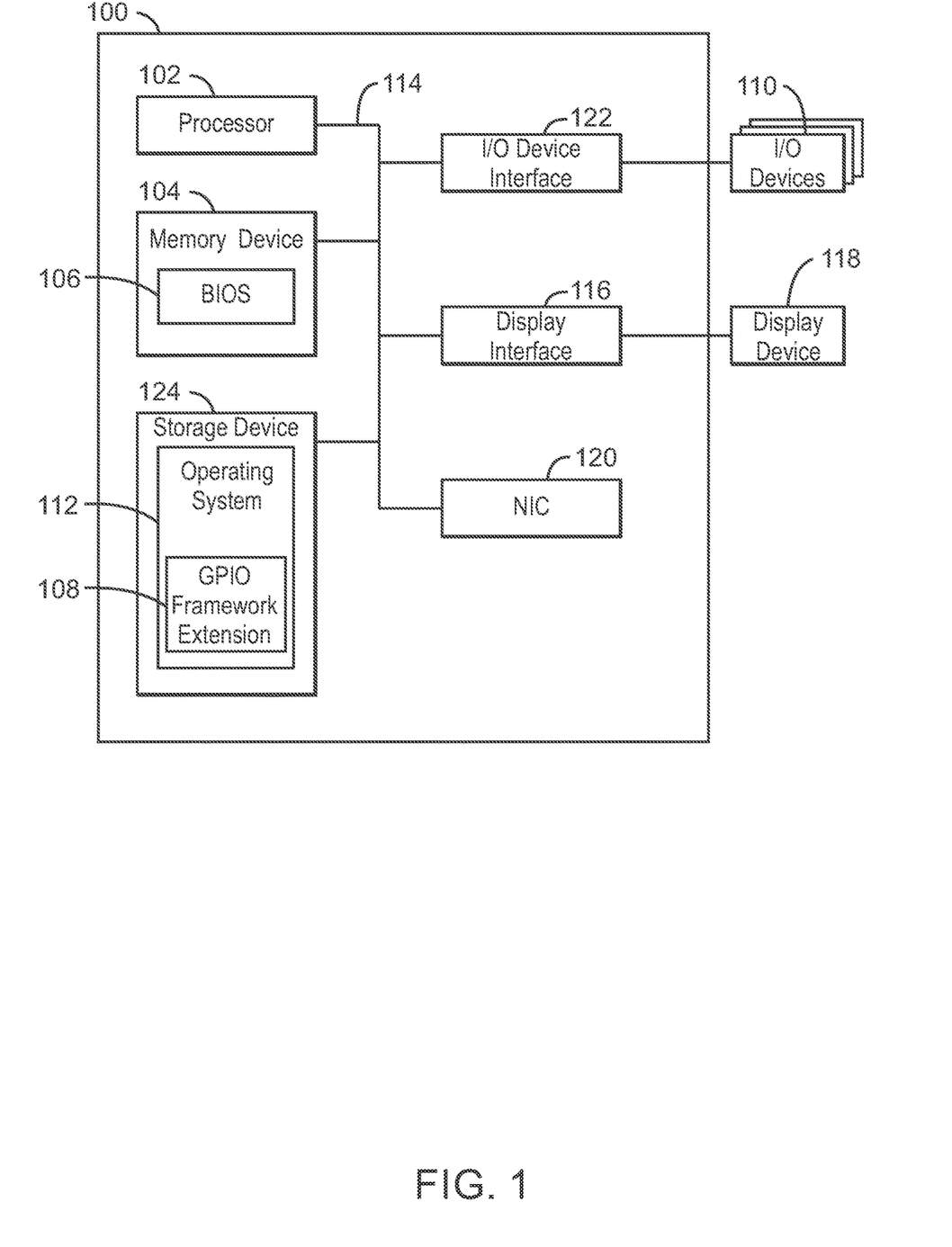
FIG. 1 illustrates a block diagram of a computing device that can modify an operating system.

FIG. 1 is a block diagram of an example of a host computing device that can modify an operating system. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can detect an error in an operating system.

In some embodiments, the memory device 104 can store instructions for a basic input/output system (BIOS) 106 and a general purpose input/output (GPIO) framework extension 108. The GPIO framework extension 108 can detect a system control interrupt from any suitable hardware device, such as an I/O device 110, among others, and transfer or forward the system control interrupt to an operating system 112 residing in a storage device 124. In some embodiments, the GPIO framework extension 108 resides in the operating system 112. The system control interrupt, as referred to herein, can include any suitable hardware signal that is to temporarily stop execution of a program being executed by the processor 102. In some examples, the system control interrupt can result in the processor 102 executing an interrupt handler to handle the system control event, which can include receiving data from an I/O device 110, and the like. In response to a system control interrupt, the operating system 112 can invoke any suitable number of modified control methods loaded from BIOS 106. The modified control methods can prevent errors from occurring when an operating system 112 invokes an ACPI related control method to be performed by a hardware device. The corresponding control methods, such as _EVT/_Lxx/_Exx, can be executed if a system control interrupt is triggered. The corresponding control methods can be used to prevent an error from occurring or add a silicon workaround to prevent silicon based errors. The modification to a control method is described in greater detail below in relation to FIG. 2.

The processor 102 may also be linked through the system interconnect 114 (e.g., PCI®, PCI-Express®, NuBus, etc.) to a display interface 116 adapted to connect the host computing device 100 to a display device 118. The display device 118 may include a display screen that is a built-in component of the host computing device 100. The display device 118 may also include a computer monitor, television, or projector, among others, that is externally connected to the host computing device 100. The display device 118 can include light emitting diodes (LEDs), and micro-LEDs, among others.

In addition, a network interface controller (also referred to herein as a NIC) 120 may be adapted to connect the host computing device 100 through the system interconnect 114 to a network (not depicted). The network (not depicted) may be a cellular network, a radio network, a wide area network (WAN), a local area network (LAN), or the Internet, among others.

The processor 102 may be connected through a system interconnect 114 to an input/output (I/O) device interface 122 adapted to connect the computing host device 100 to one or more I/O devices 110. The I/O devices 110 may include, for example, a keyboard and a pointing device, wherein the pointing device may include a touchpad or a touchscreen, among others. The I/O devices 110 may be built-in components of the host computing device 100, or may be devices that are externally connected to the host computing device 100.

In some embodiments, the processor 102 may also be linked through the system interconnect 114 to a storage device 124 that can include a hard drive, an optical drive, a USB flash drive, an array of drives, or any combinations thereof. In some embodiments, the storage device 120 can include any suitable operating system 112 and any number of applications. As discussed above, the GPIO framework extension 108 can be a part of the operating system 112 in some examples.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). For example, the storage device 124 may include a modifier to modify BIOS to enable an operating system to load a virtual GPIO driver. Furthermore, any of the functionalities of the BIOS 106, GPIO framework extension 108, and operating system 112 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the BIOS 106, GPIO framework extension 108, and operating system 112 can be implemented with logic, wherein the logic, as referred to herein, can include any suitable hardware (e.g., a processor, among others), software (e.g., an application, among others), firmware, or any suitable combination of hardware, software, and firmware.

Figure 2:
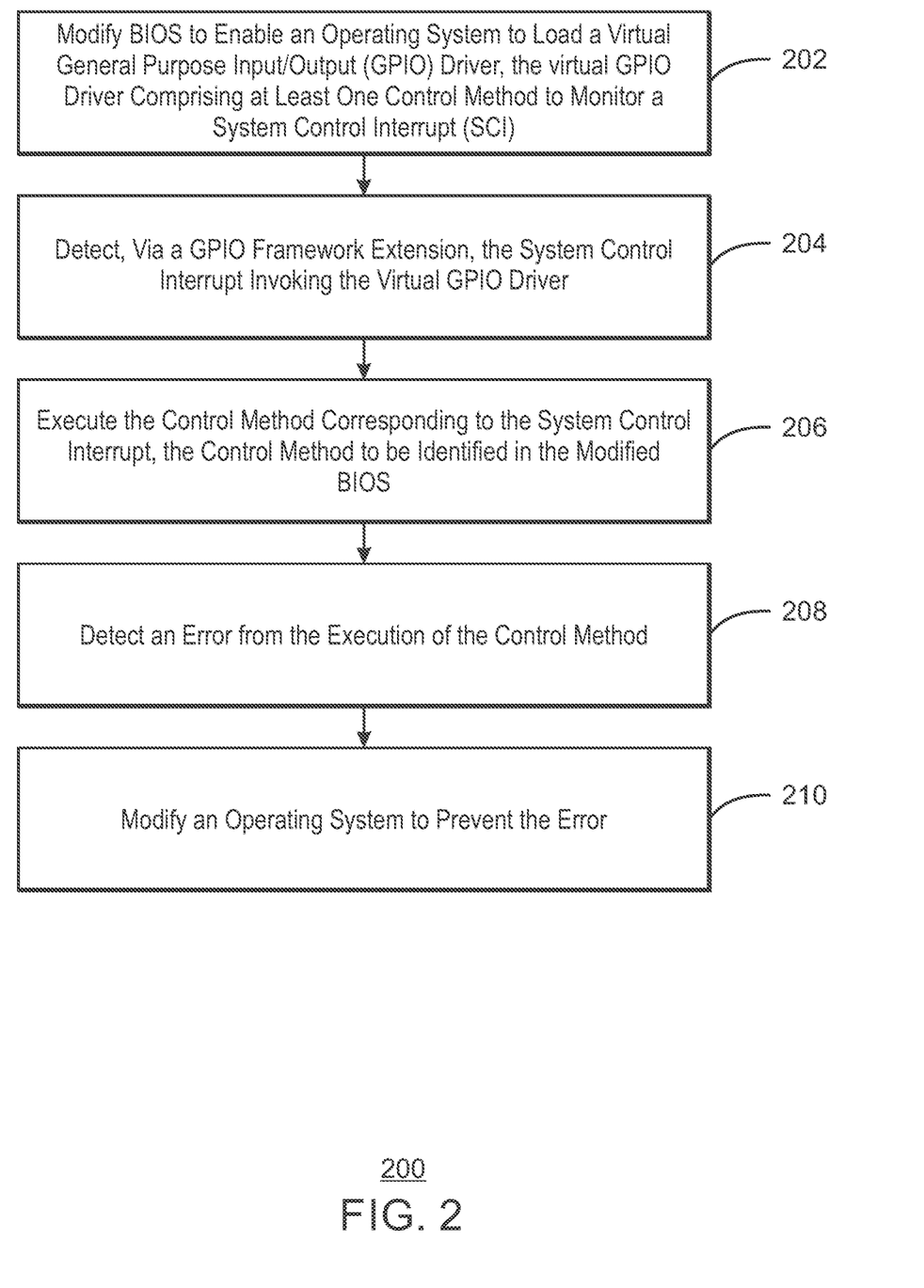
FIG. 2 illustrates a process flow diagram for modifying an operating system.

FIG. 2 illustrates a process flow diagram for modifying an operating system. The method 200 illustrated in FIG. 2 can be implemented with any suitable computing component or device, such as computing device 100 of FIG. 1.

At block 202, logic can modify a basic input/output system (BIOS) to enable an operating system to load a virtual general purpose input/output (GPIO) driver, the virtual GPIO driver comprising at least one control method to monitor a system control interrupt (SCI). For example, BIOS can be modified by modifying ACPI system description tables, ACPI registers, and ACPI system firmware. In some embodiments, the ACPI system description tables can provide a description of an interface to a hardware device. For example, the ACPI system description tables can include definition blocks of procedures written in ACPI machine language (AML). The definition blocks in the ACPI system description tables can indicate to an operating system the functions supported by hardware devices. In some embodiments, the ACPI system description tables can include a differentiated system description table (DSDT) that describes the peripheral devices connected to a computing device and provides information indicating power events for each peripheral device. For example, the DSDT can indicate supported power states, and the like, for each peripheral device. The DSDT can be used in conjunction with a fixed ACPI description table (FADT), which can indicate interrupt request mappings such as an interrupt number corresponding to an operating system. For example, the operating system may have a unique value used as an interrupt request (IRQ), which can indicate the interrupt number of the system control interrupt associated with the operating system. In some embodiments, the interrupt number indicated in the FADT can trigger the system control interrupt to be generated and sent to the operating system. In some embodiments, the FADT and DSDT can be modified to load a general purpose input/output (GPIO) framework extension based on a predetermined interrupt request value corresponding to a system control interrupt. The GPIO framework extension can be loaded so that an operating system can process any suitable interrupt from the GPIO framework extension. In some embodiments, the interrupts from the GPIO framework extension can be designed to acknowledge system control interrupts for peripheral devices such as local wireless computer network devices, devices based on short-wavelength, ultra-high frequency (UHF) radio waves, sensors, and the like.

In some embodiments, an ACPI operation region can include constrained portions of a hardware interface that are described in the ACPI system description tables. Additionally, the ACPI system firmware can include portions of firmware, such as a unified extensible firmware interface (UEFI) BIOS, that is compatible with an ACPI specification. In some embodiments, the ACPI system firmware can include control methods that are to be loaded by an operating system based on an interrupt request (IRQ) value for a system control interrupt. In the event of a system control interrupt, the GPIO framework extension can detect the IRQ value corresponding to the virtual GPIO driver and load the modified control methods stored in the virtual GPIO driver.

At block 204, logic can detect the system control interrupt invoking the virtual GPIO driver. Once an operating system has loaded the virtual general purpose input/output driver, the operating system can detect a system control interrupt (SCI) that invokes the virtual GPIO driver. For example, a hardware device can generate a system control interrupt that is sent to the GPIO framework extension, which can forward the system control interrupt to an operating system. In some embodiments, the hardware device can also send the SCI directly to the operating system. As discussed above, the interrupt request value associated with the system control interrupt can indicate to the operating system to load a control method from a virtual GPIO driver via the GPIO framework extension. Loading a control method is described in greater detail below in relation to FIG. 3.

At block 206, logic can execute the control method corresponding to the system control interrupt, the control method to be identified in the modified BIOS. For example, the operating system can forward the system control interrupt to the virtual GPIO driver via the GPIO framework extension. In some embodiments, the virtual GPIO driver can call a control method corresponding to the system control interrupt. In some examples, the operating system can perform any suitable action based on the instructions corresponding to the modified control method. In some embodiments, the action can include modifying a state of a hardware device. In some embodiments, the virtual GPIO driver can execute instructions of the modified control methods to directly affect a hardware device. In some embodiments, the hardware device can include a local area wireless network device or a device based on short-wavelength, ultra-high frequency (UHF) radio waves.

At block 208, logic can detect an error from the execution of the control method. For example, logic can execute an ACPI event handling (AEI) control method and corresponding event control methods (_EVT/_Exx/_Lxx). The AEI control method can indicate event information for a virtual GPIO device, such as a pin used by a virtual GPIO device for a GPIO signaled event. The _EVT/_Exx/_Lxx control method can be executed when an event occurs. The event can be any suitable system control interrupt generated by a hardware or peripheral device that results in a virtual GPIO driver assigning the system control interrupt to a pin based on any suitable algorithm. In some examples, when a system control interrupt is detected, the _EVT/_Exx/_Lxx control method corresponding to a particular virtual GPIO device pin can be executed. The AEI control method can indicate which virtual GPIO device pins correspond to particular _EVT/_Exx/_Lxx control methods. In some embodiments, the execution of the function from the _EVT/_Exx/_Lxx control method can be a result of a detected error from a hardware device, which can include any suitable error encountered by the hardware or peripheral device. For example, a hardware device may not transition properly between power states, may not support a power state referenced by the function from the _EVT/_Exx/_Lxx control method, and the like. In some embodiments, the _EVT/_Lxx/_Exx can detect and correct an error on a hardware device, perform silicon workarounds for silicon based errors, or perform code tracing. In some embodiments, the logic can detect which controller triggers an SCI and what caused a responding error or change.

At block 210, logic can modify an operating system to prevent the error. For example, the operating system can be modified so that any suitable control method called by the operating system results in a successful operation when executed on a hardware or peripheral device. In addition, control methods can be modified based on errors detected from hardware or peripheral devices. The modified control methods can overcome errors implemented by operating systems, and hardware devices. In some embodiments, the modified control methods can serve as patches to overcome errors encountered from hardware devices executing control methods with ACPI functions. In some examples, the virtual GPIO driver comprises a modified application program interface to be implemented in response to detecting a pin number for the virtual GPIO extension framework matches a pin number corresponding to the control method. In some embodiments, the logic can perform a workaround for a hardware limitation or error based on a detected change or error.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. In some embodiments, the control methods of the virtual GPIO driver can also be used for debugging to identify errors associated with ACPI instructions, and the like. For example, the control method can be a set of instructions that detect an error code value from a hardware device, correct the error, and modify a status of the hardware device. Additionally, in some embodiments, any suitable combination of the FADT and DSDT tables can be modified. In some examples, the modification can include adding an additional field to the DSDT, wherein the field indicates an interrupt request value corresponding to a virtual GPIO driver.

Figure 3:
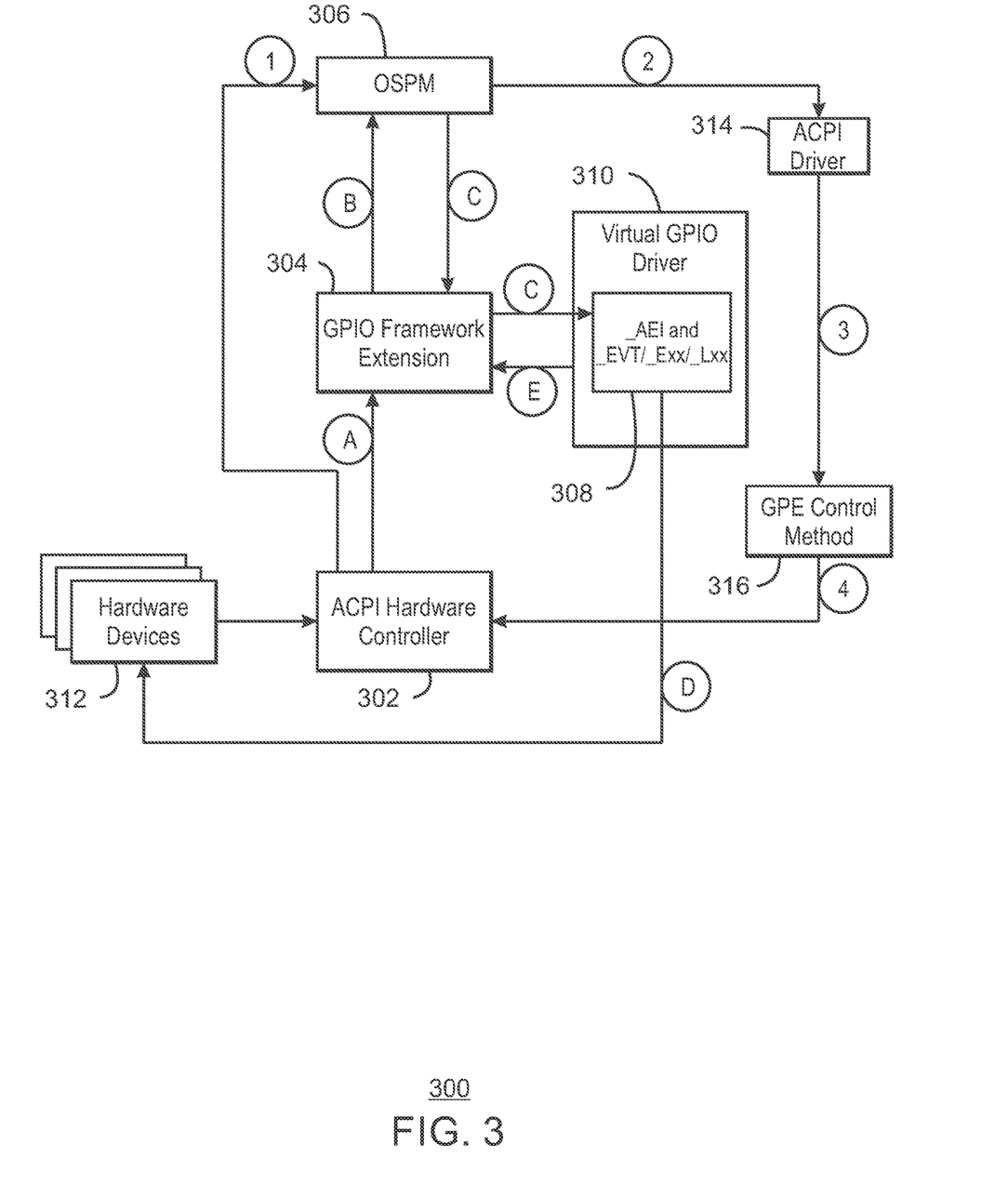
FIG. 3 illustrates a block diagram of an example system that can modify an operating system.

FIG. 3 illustrates a block diagram of a computing device that can modify an operating system. In some embodiments, any suitable computing device can modify the operating system, such as the computing device 100 of FIG. 1.

In some embodiments, an ACPI hardware controller 302 can trigger (indicated by the circled A) a system control interrupt (SCI) through the interrupt pin indicated in the FADT. The GPIO framework extension 304 can monitor the interrupt pin and forward the SCI to the virtual GPIO driver 310. In some examples, the GPIO framework extension 304 can forward (indicated by the circled B) the SCI to the operating system directed configuration and power management (OSPM) module 306. The OSPM module 306 can load (indicated by the circled C) control methods, such as _AEI and _EVT (also referred to herein as _AEI and _EVT/_Exx/_Lxx) 308, from a virtual GPIO driver 310 via the GPIO framework extension 304. In some embodiments, the control methods includes ACPI source language code and are accessed by the OSPM 306 by transmitting the SCI through the GPIO framework extension 304 to the virtual GPIO driver 310. The virtual GPIO driver 310 can determine the appropriate control methods to be executed based on the source of the SCI.

In some embodiments, the OSPM 306 can execute (indicated by the circled D) the instructions in the control method after the SCI is forwarded to the virtual GPIO driver 310 through the GPIO framework extension 304. In some examples, the control methods can detect an error code value from the hardware device 312 in response to executing instructions from the control methods. The control methods corresponding to a detected SCI can be implemented and the virtual GPIO driver 310 can return (indicated by the circled E) a status to the GPIO framework extension after the interrupt route in the virtual GPIO driver is complete. The OSPM 306 can be notified by instructions in the control methods. In some examples, the control methods include requesting the OSPM 306 to perform an action such as a bus scan or generate a device notification, among others.

In some embodiments, the ACPI hardware controller 302 can also transmit the SCI directly to the OSPM 306 if the hardware device 312 operates in a normal hardware mode or a hardware reduced mode. A normal hardware mode, as referred to herein, can indicate that a hardware device supports the fixed ACPI hardware interface. As referred to herein, hardware reduced mode can indicate that a hardware device does not support the fixed ACPI hardware interface. Rather, hardware devices that operate in a hardware reduced mode can support a generic hardware interface that provides flexibility to differentiate between power states in low-power hardware designs while enabling support for multiple operating systems. In hardware reduced modes, a hardware device may not support resource sharing between the OSPM and other asynchronous operating environments such as runtime services or a system management mode. Additionally, in a hardware reduced mode, a hardware device may not depend on an operating system to maintain cache coherency across multiple processor sleep states.

In a normal hardware mode, an ACPI hardware controller 302 can, in addition to transmitting an SCI to the GPIO framework extension 304, also transmit the SCI directly to the OSPM 306 (as indicated by the circled number 1). The OSPM 306 can transmit (as indicated by the circled number 2) the SCI to an ACPI driver 314. In a reduced hardware mode, the ACPI driver 314 may not be used to process or handle the SCI. The ACPI driver 314 can determine (as indicated by the circled 3) a function in the general purpose event (GPE) control method 316 to execute based on the SCI. The ACPI driver 314 can execute (as indicated by the circled 4) the GPE control method 316 by executing the instructions in a related GPE control method such as _EVT/_Lxx/_Exx. The instructions can detect an error from a hardware device, correct the error, and modify the status of a hardware device.

In some embodiments, the _AEI and _EVT control methods 308 can be modified to prevent errors in hardware devices 312. In some examples, the _AEI and _EVT control methods 308 can include additional ACPI functions to execute for a hardware device in hardware reduced mode. Alternatively, the GPE control methods can be executed via the ACPI driver 314 to prevent errors in hardware devices 312 in normal ACPI mode.

Figure 4:
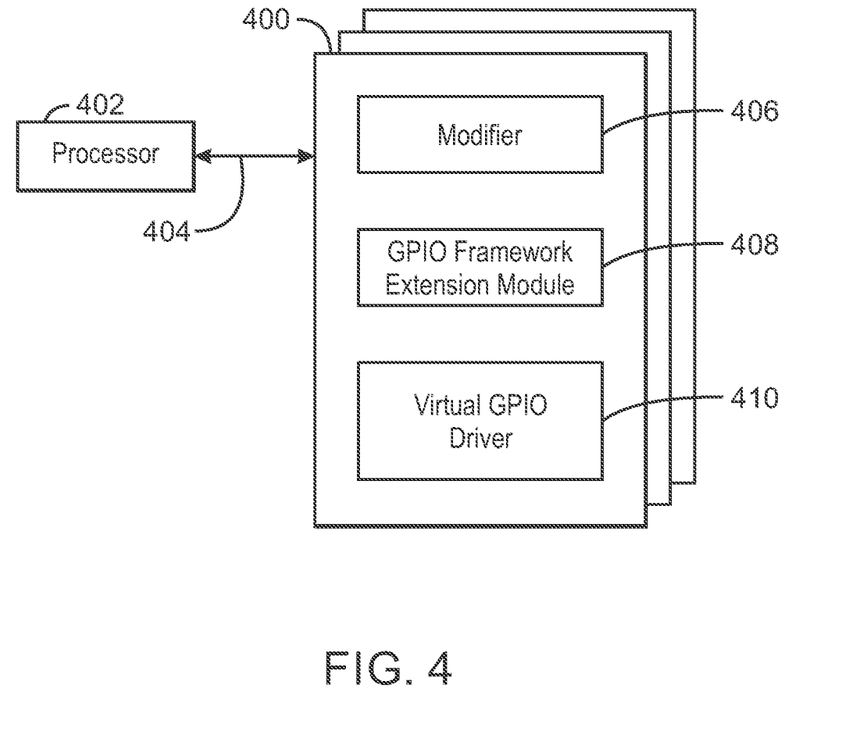
FIG. 4 is a block diagram of an example of a tangible, non-transitory computer-readable medium that can modify an operating system.

FIG. 4 is a block diagram of an example of a tangible, non-transitory computer-readable medium that can modify an operating system. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a modifier 406 may be adapted to direct the processor 402 to modify a basic input/output system (BIOS) to load a virtual general purpose input/output (GPIO) driver, the virtual GPIO driver comprising at least one control method to monitor a system control interrupt (SCI). In some embodiments, a GPIO framework extension module 408 can detect the system control interrupt invoking the virtual GPIO driver. In some examples, a virtual GPIO driver 410 can execute the control method corresponding to the system control interrupt, the control method to be identified in the modified BIOS. The virtual GPIO driver 410 can also detect an error from the execution of the control method and modify an operating system to prevent the error.

It is to be understood that any number of additional software components not shown in FIG. 4 may be included within the tangible, non-transitory, computer-readable medium 400, depending on the specific application.

Example 1

In some embodiments, a system for modifying operating systems can include logic to modify a basic input/output system (BIOS) to load a virtual general purpose input/output (GPIO) driver, the virtual GPIO driver comprising at least one control method to monitor a system control interrupt (SCI). The logic can also detect the system control interrupt invoking the virtual GPIO driver and execute the control method corresponding to the system control interrupt, the control method to be identified in the modified BIOS. Furthermore, the logic can detect an error from the execution of the control method and modify an operating system to prevent the error.

In some examples, the modification to the operating system can include a modification to the control method. In some embodiments, the logic can load the virtual GPIO driver in response to a virtual GPIO extension framework detecting the system control interrupt. Alternatively, or in addition, the logic can modify a description table in the basic input/output system to enable a virtual GPIO extension framework to detect the system control interrupt. Alternatively, or in addition, the logic can execute the control method to detect an error code value from the hardware device. Alternatively, or in addition, the logic can modify a differentiated system description table (DSDT) in the BIOS. Alternatively, or in addition, the modification to the DSDT can include adding a field, the field indicating that an interrupt request corresponds to an interrupt request number used as the SCI. Alternatively, or in addition, the hardware device can be a local area wireless network device or a device based on short-wavelength, ultra-high frequency (UHF) radio waves. Alternatively, or in addition, the control method can include ACPI source language code. Alternatively, or in addition, the hardware device can operate in reduced hardware mode and the control method can include additional ACPI functions.

Example 2

In some embodiments, a method for modifying operating systems can include modifying a basic input/output system (BIOS) to load a virtual general purpose input/output (GPIO) driver, the virtual GPIO driver comprising at least one control method to monitor a system control interrupt (SCI). The method can also include detecting the system control interrupt invoking the virtual GPIO driver and executing the control method corresponding to the system control interrupt, the control method to be identified in the modified BIOS. Furthermore, the method can include detecting an error from the execution of the control method and modifying an operating system to prevent the error, the modification comprising a modification to the control method.

In some embodiments, the method can include loading the virtual GPIO driver in response to a virtual GPIO extension framework detecting the system control interrupt, the virtual GPIO driver comprising a modified application program interface to be implemented in response to detecting a pin number for the virtual GPIO extension framework matches a pin number corresponding to the control method. Alternatively, or in addition, the method can include modifying a description table in the basic input/output system to enable a virtual GPIO extension framework to detect the system control interrupt. Alternatively, or in addition, the method can include executing the control method and detecting an error code value from the hardware device. Alternatively, or in addition, the method can include modifying a differentiated system description table (DSDT) in the BIOS. Alternatively, or in addition, the modification to the DSDT can include adding a field, the field indicating that an interrupt request corresponds to an interrupt request number used as the SCI. Alternatively, or in addition, the hardware device can be a local area wireless network device or a device based on short-wavelength, ultra-high frequency (UHF) radio waves. Alternatively, or in addition, the control method can include ACPI source language code. Alternatively, or in addition, the hardware device can operate in reduced hardware mode and the control method can include additional ACPI functions.

Example 3

In yet another example, at least one non-transitory machine readable medium can have instructions stored therein that, in response to being executed on an electronic device, cause the electronic device to modify a basic input/output system (BIOS) to load a virtual general purpose input/output (GPIO) driver, the virtual GPIO driver comprising at least one control method to monitor a system control interrupt (SCI). The instructions can also cause the processor to detect the system control interrupt invoking the virtual GPIO driver and execute the control method corresponding to the system control interrupt, the control method to be identified in the modified BIOS. Furthermore, the instructions can cause the processor to detect an error from the execution of the control method and modify an operating system to prevent the error, the modification comprising a modification to the control method.

In some embodiments, the instructions can cause the processor to load the virtual GPIO driver in response to a virtual GPIO extension framework detecting the system control interrupt. Alternatively, or in addition, the instructions can cause the processor to modify a description table in the basic input/output system to enable a virtual GPIO extension framework to detect the system control interrupt. Alternatively, or in addition, the instructions can cause the processor to execute the control method and detect an error code value from the hardware device. Alternatively, or in addition, the instructions can cause the processor to modify a differentiated system description table (DSDT) in the BIOS. Alternatively, or in addition, the modification to the DSDT can include adding a field, the field indicating that an interrupt request corresponds to an interrupt request number used as the SCI. Alternatively, or in addition, the hardware device can be a local area wireless network device or a device based on short-wavelength, ultra-high frequency (UHF) radio waves. Alternatively, or in addition, the control method can include ACPI source language code. Alternatively, or in addition, the hardware device can operate in reduced hardware mode and the control method can include additional ACPI functions.

Example 4

In another example, an apparatus for modifying an operating system can include a means for modifying a basic input/output system (BIOS) to load a virtual general purpose input/output (GPIO) driver, the virtual GPIO driver comprising at least one control method to monitor a system control interrupt (SCI). The apparatus can also include a means for detecting the system control interrupt invoking the virtual GPIO driver and a means for executing the control method corresponding to the system control interrupt, the control method to be identified in the modified BIOS. Furthermore, the apparatus can include a means for detecting an error from the execution of the control method and means for modifying an operating system to prevent the error, the modification comprising a modification to the control method.

In some embodiments, the apparatus can include means for loading the virtual GPIO driver in response to a virtual GPIO extension framework detecting the system control interrupt. Alternatively, or in addition, the apparatus can include means for modifying a description table in the basic input/output system to enable a virtual GPIO extension framework to detect the system control interrupt. Alternatively, or in addition, the apparatus can include means for executing the control method and detecting an error code value from the hardware device. Alternatively, or in addition, the apparatus can include means for modifying a differentiated system description table (DSDT) in the BIOS. Alternatively, or in addition, the modification to the DSDT can include adding a field, the field indicating that an interrupt request corresponds to an interrupt request number used as the SCI. Alternatively, or in addition, the hardware device can be a local area wireless network device or a device based on short-wavelength, ultra-high frequency (UHF) radio waves. Alternatively, or in addition, the control method can include ACPI source language code. Alternatively, or in addition, the hardware device can operate in reduced hardware mode and the control method can include additional ACPI functions.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for modifying operating systems comprising:
   logic to:
   modify a basic input/output system (BIOS) to load a virtual general purpose input/output (GPIO) driver, the virtual GPIO driver comprising at least one control method corresponding to a system control interrupt (SCI);
   detect the system control interrupt invoking the virtual GPIO driver;
   execute the control method corresponding to the system control interrupt, the control method to be identified in the modified BIOS;
   detect an error from the execution of the control method; and
   modify an operating system to prevent the error.

2. The system of claim 1, wherein the modification to the operating system comprises a modification to the control method.

3. The system of claim 1, wherein the logic is to load the virtual GPIO driver in response to a virtual GPIO extension framework detecting the system control interrupt.

4. The system of claim 1, wherein the logic is to modify a description table in the basic input/output system to enable a virtual GPIO extension framework to detect the system control interrupt.

5. The system of claim 1, wherein the logic is to:
   detect an error code value by the control method from a hardware device.

6. The system of claim 1, wherein the logic is to modify a differentiated system description table (DSDT) in the BIOS.

7. The system of claim 6, wherein the modification to the DSDT comprises adding a field, the field indicating that an interrupt request corresponds to an interrupt request number used as the SCI.

8. The system of claim 5, wherein the hardware device comprises a local area wireless network device or a device based on short-wavelength, ultra-high frequency (UHF) radio waves.

9. The system of claim 1, wherein the control method comprises ACPI source language code.

10. The system of claim 1, wherein a hardware device operates in reduced hardware mode and the control method comprises additional ACPI functions.

11. A method for modifying operating systems comprising:
    modifying a basic input/output system (BIOS) to load a virtual general purpose input/output (GPIO) driver, the virtual GPIO driver comprising at least one control method to monitor a system control interrupt (SCI);
    detecting the system control interrupt invoking the virtual GPIO driver;
    executing the control method corresponding to the system control interrupt, the control method to be identified in the modified BIOS;
    detecting an error from the execution of the control method; and
    modifying an operating system to prevent the error, the modification comprising a modification to the control method.

12. The method of claim 11, comprising loading the virtual GPIO driver in response to a virtual GPIO extension framework detecting the system control interrupt, the virtual GPIO driver comprising a modified application program interface to be implemented in response to detecting a pin number for the virtual GPIO extension framework matches a pin number corresponding to the control method.

13. The method of claim 11, comprising modifying a description table in the basic input/output system to enable a virtual GPIO extension framework to detect the system control interrupt.

14. The method of claim 11 comprising:
    detecting an error code value from a hardware device.

15. The method of claim 11, comprising modifying a differentiated system description table (DSDT).

16. The method of claim 14, wherein the hardware device comprises a local area wireless network device or a device based on short-wavelength UHF radio waves.

17. The method of claim 11, wherein a hardware device operates in reduced function mode and the control method comprises additional ACPI functions.

18. At least one non-transitory machine readable medium having instructions stored therein that, in response to being executed on an electronic device, cause the electronic device to:
    modify a basic input/output system (BIOS) to load a virtual general purpose input/output (GPIO) driver, the virtual GPIO driver comprising at least one control method to monitor a system control interrupt (SCI);
    detect the system control interrupt invoking the virtual GPIO driver, wherein an interrupt request value associated with the system control interrupt indicates the at least one control method to load from the virtual GPIO driver;
    execute the control method corresponding to the system control interrupt, the control method to be identified in the modified BIOS;
    detect an error from the execution of the control method; and
    modify an operating system to prevent the error, the modification comprising a modification to the control method.

19. The at least one non-transitory machine readable medium of claim 18, wherein the instructions cause the electronic device to load the virtual GPIO driver in response to a virtual GPIO extension framework detecting the system control interrupt.

20. The at least one non-transitory machine readable medium of claim 18, wherein the instructions cause the electronic device to modify a description table in the basic input/output system to enable a virtual GPIO extension framework to detect the system control interrupt.

* * * * *